Aug. 9, 1955  F. M. DEMER ET AL  2,714,841
PHOTOGRAPHIC RECORDER

Filed Dec. 30, 1950  10 Sheets-Sheet 2

Inventors
FREDERICK M. DEMER
RALPH G. MORK

Albert R. Hodges
Attorney

Aug. 9, 1955  F. M. DEMER ET AL  2,714,841
PHOTOGRAPHIC RECORDER

Filed Dec. 30, 1950  10 Sheets-Sheet 3

Inventors
FREDERICK M. DEMER
RALPH G. MORK

Albert R. Hodges
Attorney

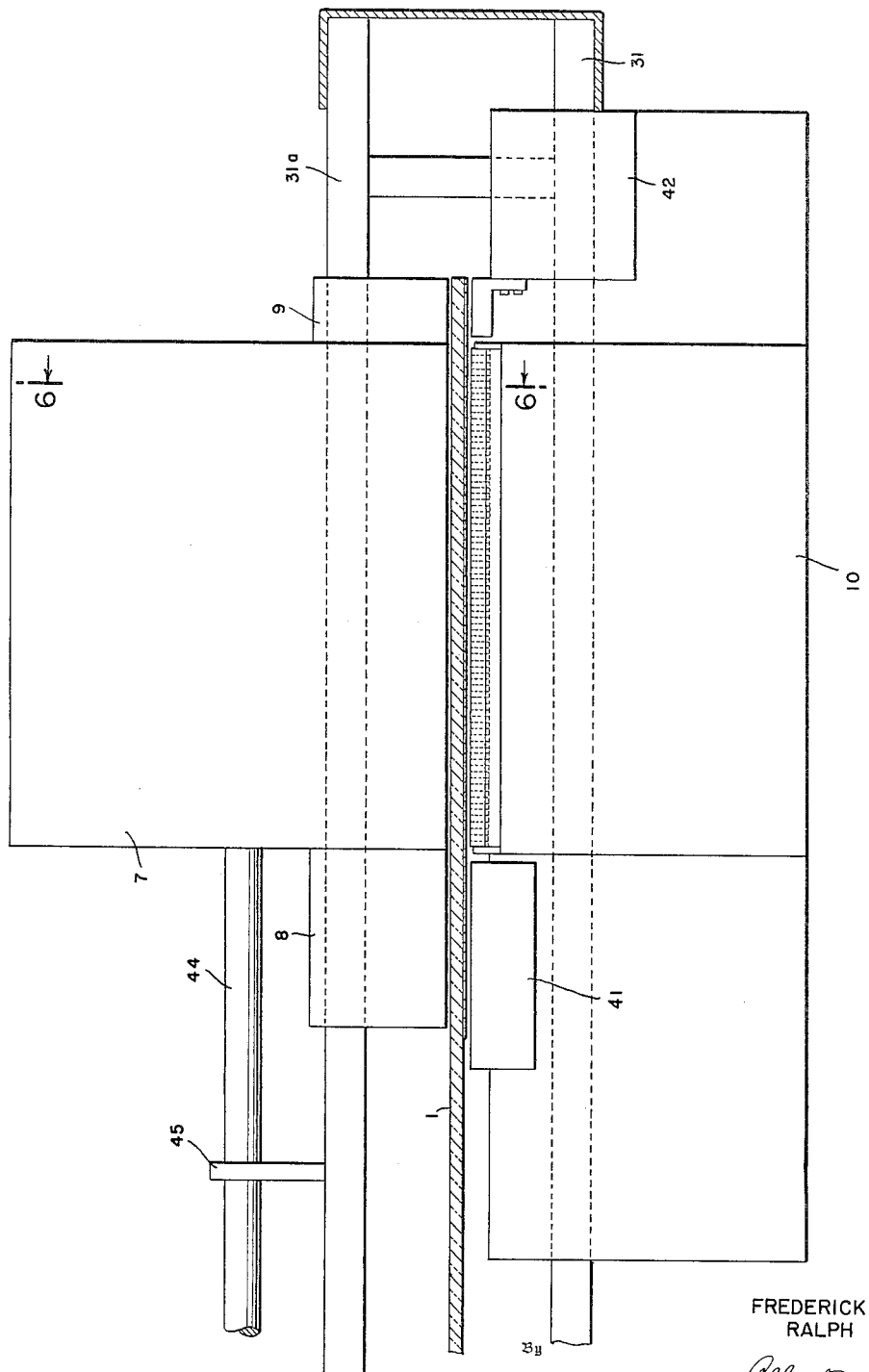

Aug. 9, 1955  F. M. DEMER ET AL  2,714,841
PHOTOGRAPHIC RECORDER
Filed Dec. 30, 1950  10 Sheets-Sheet 5

Inventors
FREDERICK M. DEMER
RALPH G. MORK

Albert R. Hodges
Attorney

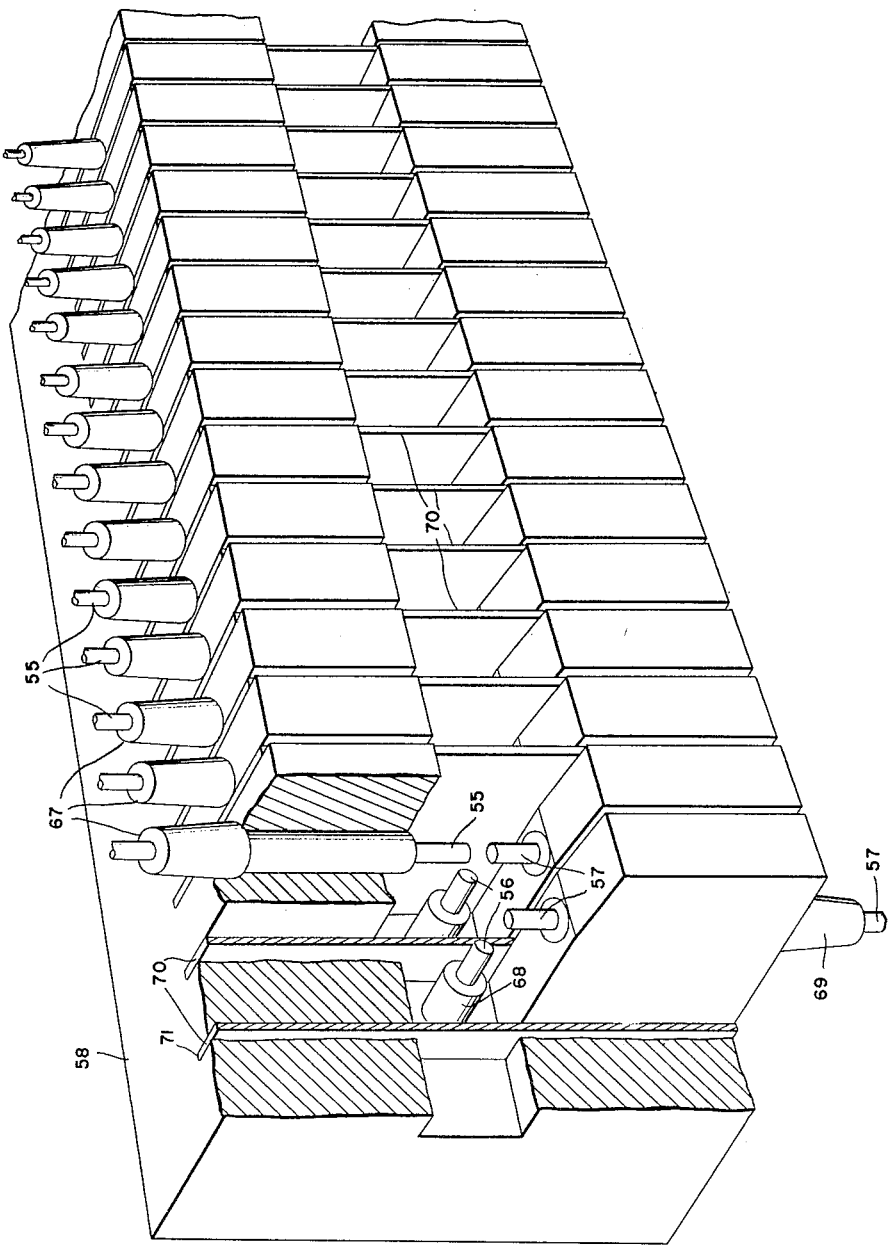

Aug. 9, 1955        F. M. DEMER ET AL        2,714,841
PHOTOGRAPHIC RECORDER
Filed Dec. 30, 1950                           10 Sheets-Sheet 7

Inventors
FREDERICK M. DEMER
RALPH G. MORK
By
Albert R. Hodges
Attorney

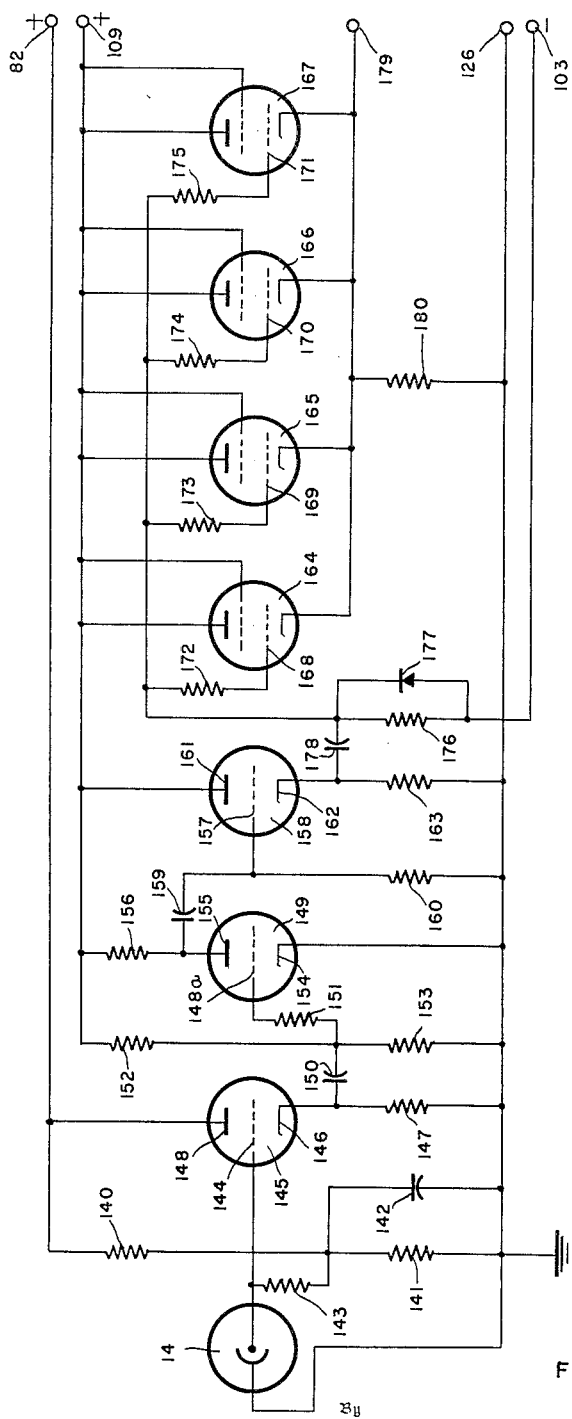

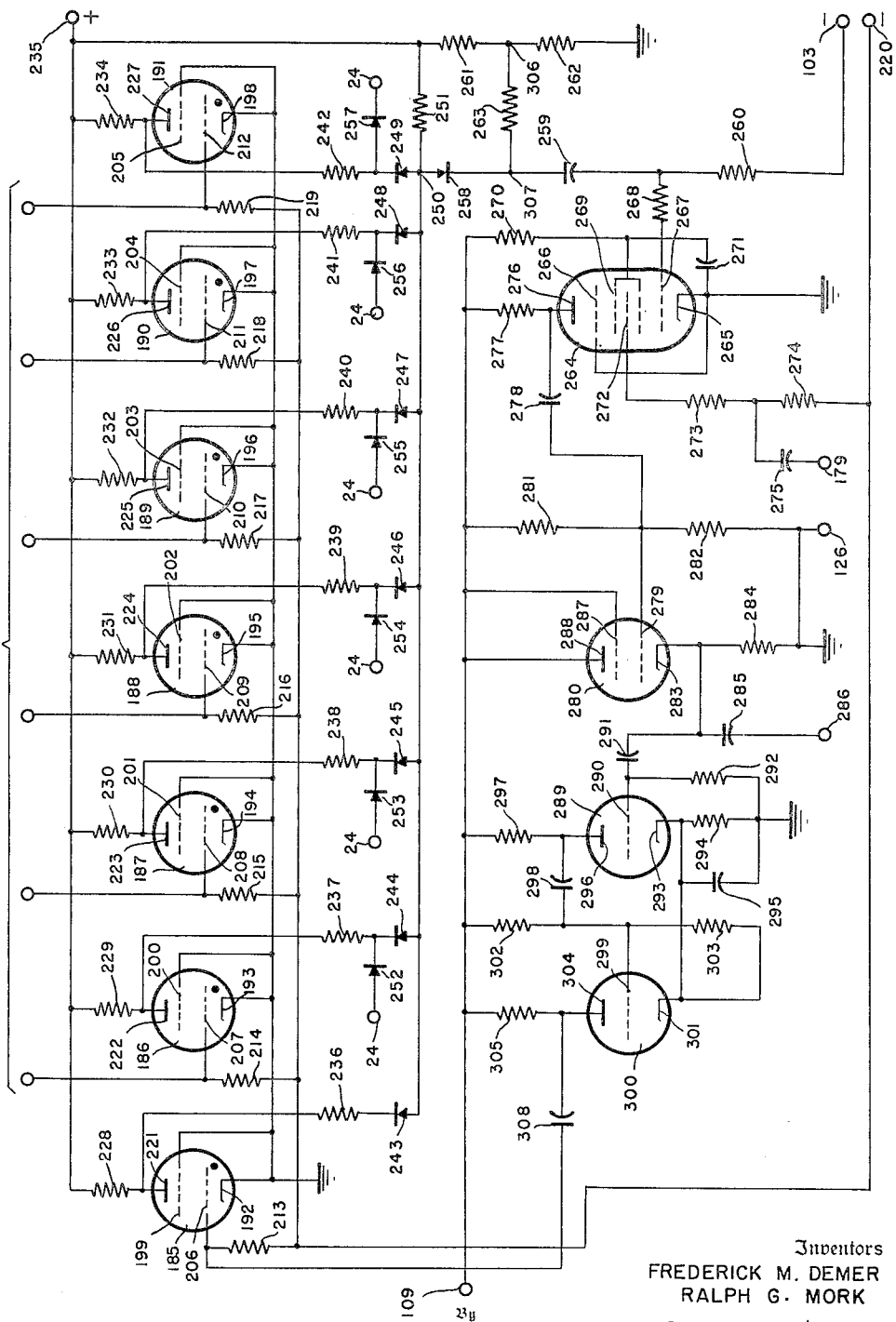

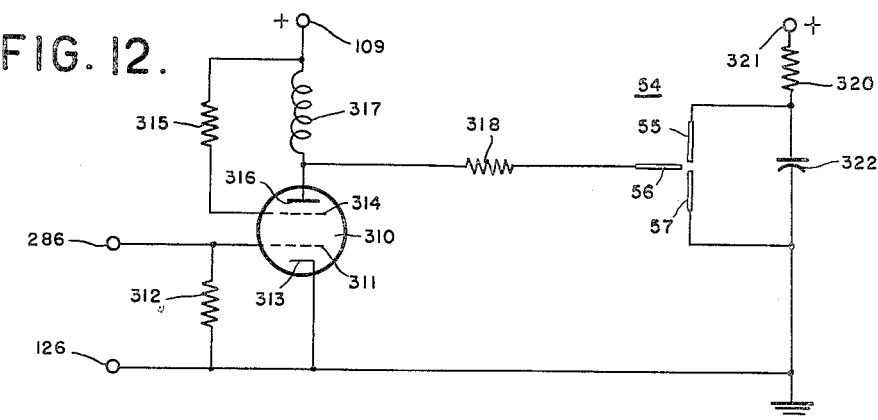
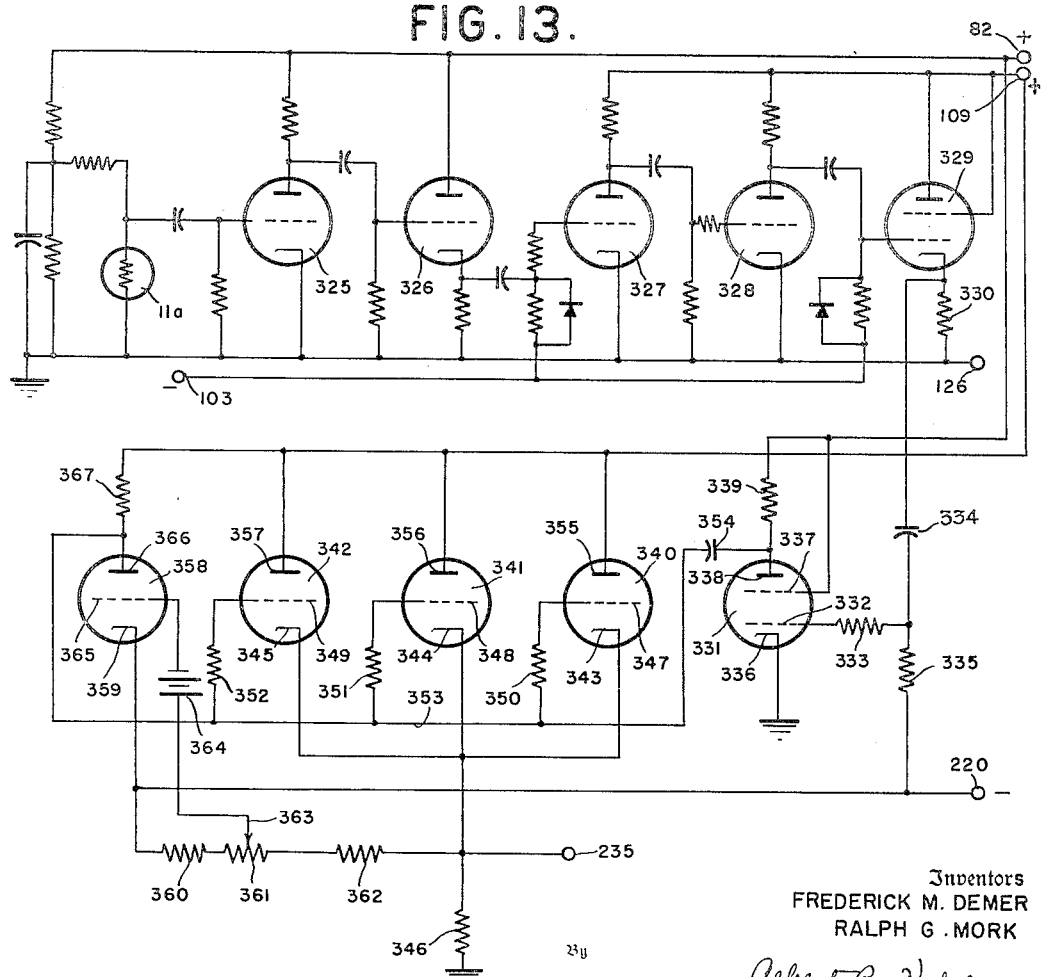

United States Patent Office 2,714,841
Patented Aug. 9, 1955

2,714,841

PHOTOGRAPHIC RECORDER

Frederick M. Demer, Johnson City, and Ralph G. Mork, Endicott, N. Y., assignors to International Business Machines Corporation, New York, N. Y., a corporation of New York Application December 30, 1950, Serial No. 203,747

4 Claims. (Cl. 95—4.5)

This invention relates to recorders, and more particularly to photographic recorders for recording data stored in code form by punch cards, electronic computers, magnetic tapes, storage tubes, or in other devices.

A principal object of the present invention is to provide a data recorder which is capable of operating at speeds substantially higher than those attained by previously known arrangements.

Another object of the present invention is to provide a non-contact type of recorder in which the character- or indication-bearing element is in constant motion during recording operations.

A further object of the present invention resides in the provision of a photographic recording apparatus wherein data is selectively photographed from a continuously moving data-bearing element.

Still another object of the present invention is to provide an improved inertialess exposure-effecting means brought into action under the control of record-analyzing means whereby the use of mechanical shutters may be obviated.

An additional object of the present invention is the provision of a photographic recorder employing triggered arcs as exposure-effecting means with provision for cyclically timing the discharge of these arcs to effectuate selective exposure operation.

It is yet another object of the present invention to provide an improved multiple light source for a photographic recorder.

Still another object of the present invention is to provide an improved electronic storage unit especially adapted for use in a photographic recorder.

In accordance with the present invention, there is provided in a photographic recorder a continuously movable character-carrying member, such as a disc, a drum or a belt, having a plurality of columns of characters, the characters in these columns being arranged in sets. Means are provided adjacent one surface of this member for supporting a photographic medium in position for exposure. Means are provided for selectively exposing the characters on this member upon the photographic medium, these exposing means including a plurality of triggered arcs, one for each column of characters, the arcs being fixedly disposed adjacent the other surface of the character-carrying member. Means are also provided for firing each of the arcs no more than once at a selected differential time during the transit of each of the sets of characters past the photographic medium, each arc upon being fired trans-illuminating the member and exposing a single character once to the photographic medium.

In accordance with an important feature of the present invention, the character-carrying member may also carry code markings, preferably arranged in individual and group configurations, the firing of the arcs being dependent upon the code markings, and more particularly, the choice of the arc to be fired depending upon the grouped code markings and the exact time of firing depending upon the individual code markings.

Another important feature of the present invention contemplates the provision of a multiple light source for a photographic recorder, comprising the combination of a plurality of triggered arcs, each having a pair of principal electrodes and a triggering electrode, these arcs being closely adjacently disposed. A substantially opaque barrier is disposed between each pair of the arcs. Means are provided for maintaining a potential difference between the principal electrodes of each of the arcs normally insufficient to cause electric discharge therebetween. Additional means are provided for selectively causing independent discharge to occur between the principal electrodes of each arc by the application of a suitable potential between the triggering electrode and one of the principal electrodes of this arc. The means for maintaining the potential difference between the principal electrodes preferably comprises electrostatic storage means, and the means for selectively causing independent discharge of each arc to occur preferably comprises inductive storage means.

Still another important feature of the present invention is the provision of an electronic storage unit for a photographic recorder comprising the combination of a plurality of electron discharge devices which are normally non-conductive, these discharge devices having input circuits and output circuits including a common load impedance. A first series of input terminals is provided, these terminals being operatively connected respectively to the input circuits of the discharge devices for rendering the discharge devices respectively conductive in the presence of signals on the first series of input terminals. There is also provided a second series of input terminals operatively connected respectively to the output circuits of the discharge devices whereby a positive potential applied to each of the terminals of this second series substantially overcomes the potential drop across the common load impedance due to the conductivity of the corresponding one of the discharge devices. Means are provided for utilizing the resultant change in the potential drop across the common load impedance. The invention also features the provision of means for preventing the application of subsequent groups of positive potentials to the second series of input terminals from producing an additional change in potential drop across the common load impedance. The electronic storage unit disclosed herein is disclosed and claimed in copending divisional application Ser. No. 253,158 filed October 25, 1951.

Other objects of the invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Fig. 4 is a section taken on line 4—4 of Fig. 3, to an enlarged scale;

Fig. 7 is a perspective view, partly in section, of the multiple light source or arc unit of Figs. 1 and 4;

Fig. 10 is a circuit diagram of the timing mark shaper and amplifier unit of Fig. 1;

Fig. 11 is a circuit diagram of one of the storage units of Fig. 1;

Fig. 12 is a circuit diagram of a single trigger generator and associated triggered arc of Fig. 1; and Fig. 13 is a circuit diagram of the reset amplifier and associated equipment of Fig. 1.

The system as a whole

Figure 1:
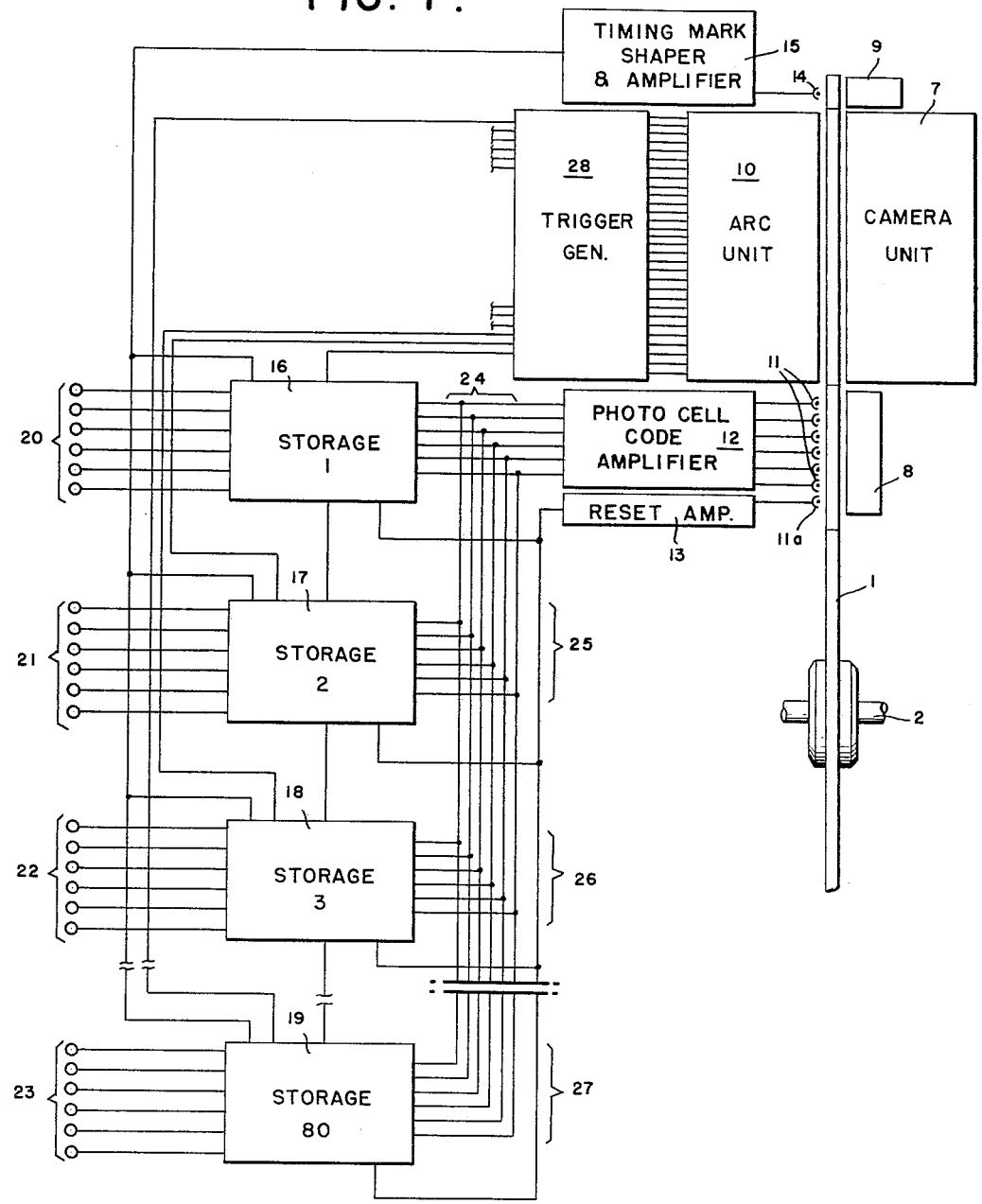
Fig. 1 is a block diagram of a photographic recorder in accordance with the present invention, certain of the duplicate elements having been omitted for the sake of compactness.
Figure 2:
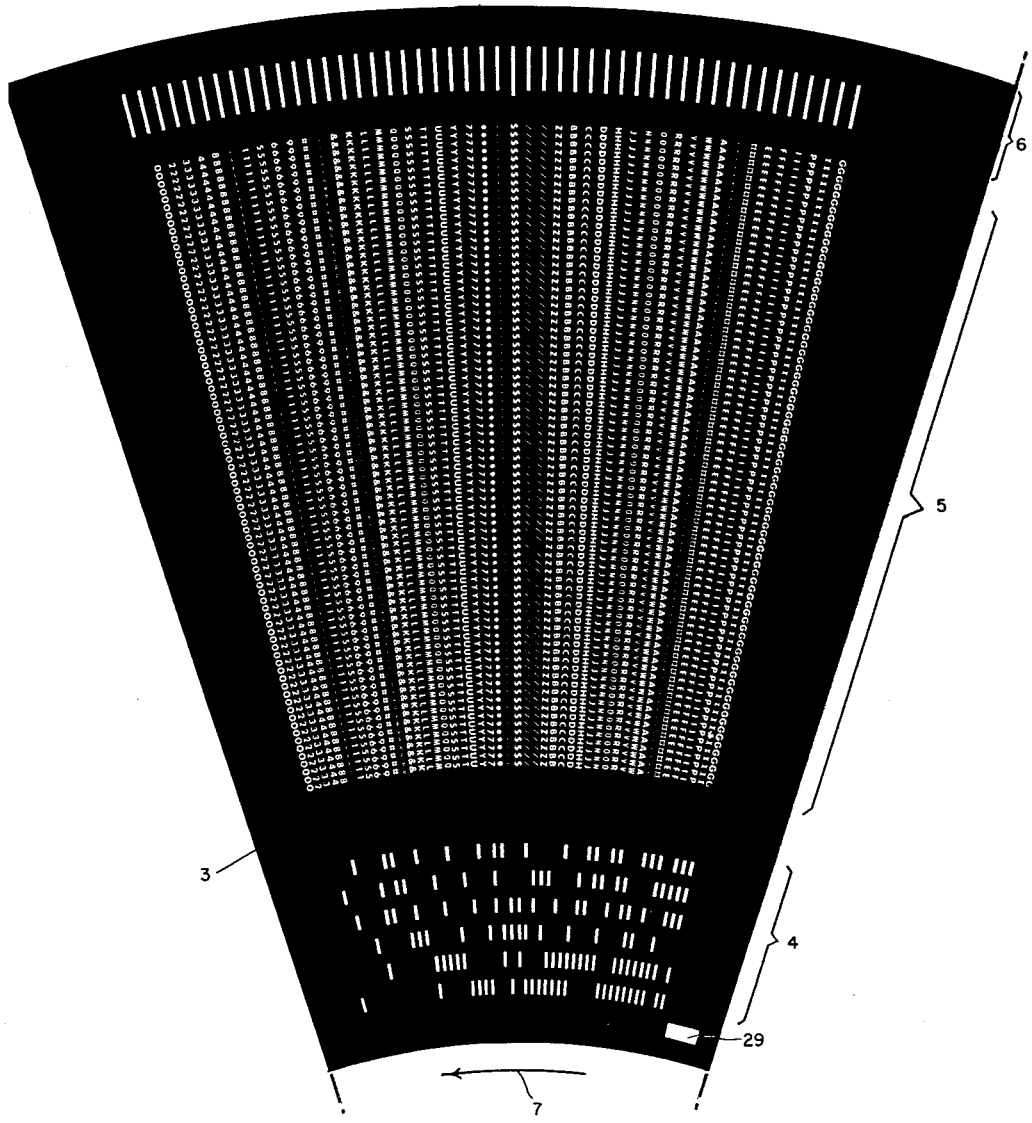
Fig. 2 illustrates one segment of the character-carrying member or disc of Fig. 1.

Referring to Figs. 1 and 2, there is shown by way of example an embodiment of the present invention which is adapted to photographically record data in 80-character lines, the data being supplied in the form of a 6-position code. The movable character-carrying member comprises a disc 1, preferably made of a transparent material such as glass, and arranged on a shaft 2 to rotate about an axis parallel with the plane of the drawing. As more clearly shown in Fig. 2, disc member 1 carries on its surface a plurality of segmental stencils 3, each of which includes a plurality of grouped code markings represented collectively by the reference numeral 4, a plurality of sets of characters represented by 5, and a series of individual code markings 6. Each segment moves from right to left as indicated by the arrow 7 in Fig. 2.

Adjacent one surface of disc member 1 is disposed a camera unit 7, a first light source 8 and a second light source 9. Camera unit 7 is disposed opposite the portion of disc member 1 carrying characters 5 (Fig. 2). Light sources 8 and 9 are disposed respectively opposite code markings 4 and 6 (Fig. 2).

Adjacent the other surface of disc member 1 and opposite camera unit 7 is disposed a multiple light source or arc unit 10 containing a plurality of triggered arcs, one of these arcs being positioned to correspond with each of the columns of characters carried by stencils 3 on disc member 1. Disposed opposite light source 8 are a plurality of photocells 11, the upper six of which are connected to a photocell code amplifier unit 12, and the lower one 11a of which is connected to a reset amplifier unit 13. Photocells 11 are positioned adjacent the portion of stencils 3 on disc member 1 carrying grouped code markings 4 (Fig. 2). Opposite light source 9 is disposed a photocell 14 which is connected to a timing mark shaper and amplifier unit 15, and which is actuated by individual code markings 6 (Fig. 2) carried by stencils 3 on disc member 1.

There are provided a plurality of storage units, one corresponding with each of the arcs in arc unit 10, and four of which are illustrated by blocks 16, 17, 18 and 19. Connected to each of storage units 16–19 is a first series of input terminals indicated respectively at 20, 21, 22 and 23, to which is applied the code data information to be recorded. Also associated with each of storage units 16–19 is a second series of input terminals indicated respectively at 24, 25, 26 and 27, these input terminals being connected in parallel as indicated to the output of photocell code amplifier unit 12.

A connection is also made from each of storage units 16–19 to the output of reset amplifier 13. The output of timing mark shaper and amplifier unit 15 is likewise applied to each of storage units 16–19. The outputs of storage units 16–19 are connected respectively to individual channels of a trigger generator unit 28, the outputs of these channels each being in turn connected to an individual triggered arc in arc unit 10.

The operation of the device of Fig. 1 will now be outlined. Disc member 1 revolves in a counterclockwise direction (as viewed in Fig. 2), and coding impulses are developed by photocells 11 which in turn are supplied through photocell code amplifier unit 12 to each of storage units 16–19. In these storage units, the code pulses are effectively compared with the code data previously supplied respectively on input terminal groups 20–23. When a coincidence in these two inputs occurs within a storage unit the corresponding channel in trigger generator unit 28 is energized, causing, in turn, the discharge of the associated triggered arc in arc unit 10. The flash of this arc causes the illumination of the appropriate character of stencil 3 with the resultant exposure of a photographic medium, as for example a film, contained in camera unit 7. The actual firing of any one of the triggered arcs takes place only when a pulse is developed by photocell 14 due to an individual code marking 6 (Fig. 2) which, in turn, is modified and amplified by unit 15 and supplied to each of storage units 16–19.

At the completion of a recording cycle, which corresponds with the passing of a complete segmental stencil 3 in front of arc unit 10, a pulse is developed by photocell 11a in response to a code opening or marking 29 (Fig. 2), amplified in unit 13, and utilized to reset each storage unit 16–19 in readiness for the next recording cycle.

It will be seen, therefore, that disc member 1 moves continuously, but that only a single character in each column is trans-illuminated during each recording cycle. Each recording cycle corresponds with one line of the data to be recorded, so that the resultant photographic record comprises a line which may have, in the example illustrated, as many as 80 characters, these characters having been photographed in rapid succession or, in some cases, at a single instant.

The disc assembly

Figure 3:
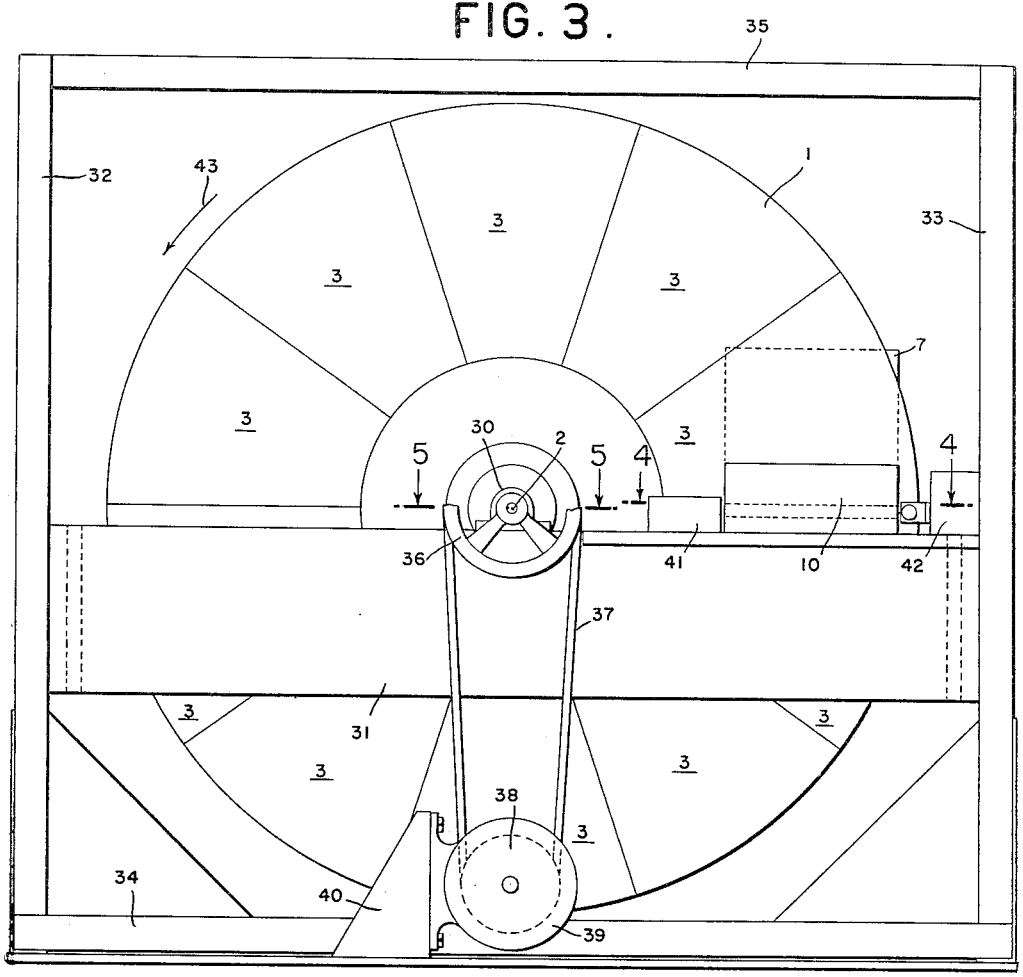
Fig. 3 is an elevation of the disc assembly of a photographic recorder in accordance with the present invention.

Referring now to Fig. 3, there is shown an elevation of the disc assembly of the arrangement of Fig. 1. As shown, disc 1 is carried on shaft 2 which, in turn, is supported by suitable bearings 30 on horizontal frame members 31 and 31a, in turn supported by upright members 32 and 33 from a base member 34. The upper ends of members 32 and 33 are joined by a member 35.

Shaft 2 carries a pulley 36 which is driven by a belt 37 also running on a pulley 38 on the shaft of a suitable motor 39, the latter being supported on base member 34 by a suitable bracket 40.

Supported by member 31 is arc unit 10, housing 41 for photocells 11 and 11a, and housing 42 for photocell 14. Camera unit 7 is mounted opposite the surface indicated of disc member 1. As illustrated in outline only, disc member 1 carries a plurality of stencils 3, and rotates in the direction indicated by the arrow 43.

Figure 5:
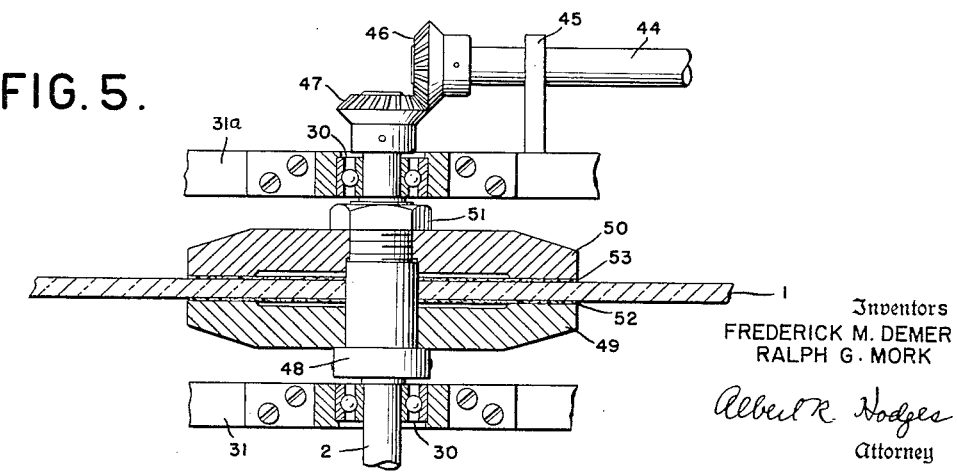
Fig. 5 is a section taken on line 5—5 of Fig. 3, also to an enlarged scale.

Figs. 4 and 5 illustrate in more detail the arrangement of Fig. 3. Fig. 4 shows a section taken on line 4—4 of Fig. 3, more clearly bringing out the relative positions of disc member 1, camera unit 7, light sources 8 and 9, arc unit 10, and photocell housings 41 and 42. There is also shown in this figure a shaft 44 supported by suitable bearing members 45 and entering camera unit 7. As brought out more clearly in Fig. 5, which is a section taken on line 5—5 of Fig. 3, shaft 44 is driven, preferably through a pair of bevel gears 46 and 47, from shaft 2 carrying disc member 1. The purpose of this shaft is to move the film in camera unit 7 in synchronism with the rotation of disc member 1. Fig. 5 also shows more clearly bearings 30 carrying shaft 2, and the arrangement for securing disc member 1 to shaft 2. This arrangement comprises a hub member 48 secured in any suitable manner to shaft 2, a pair of washers 49 and 50, and a clamping nut 51 arranged to threadably engage hub 48. If desired, suitable resilient washers 52 and 53, for example of cork, may be employed to prevent damage to disc member 1 by clamping washers 49 and 50.

Figure 6:
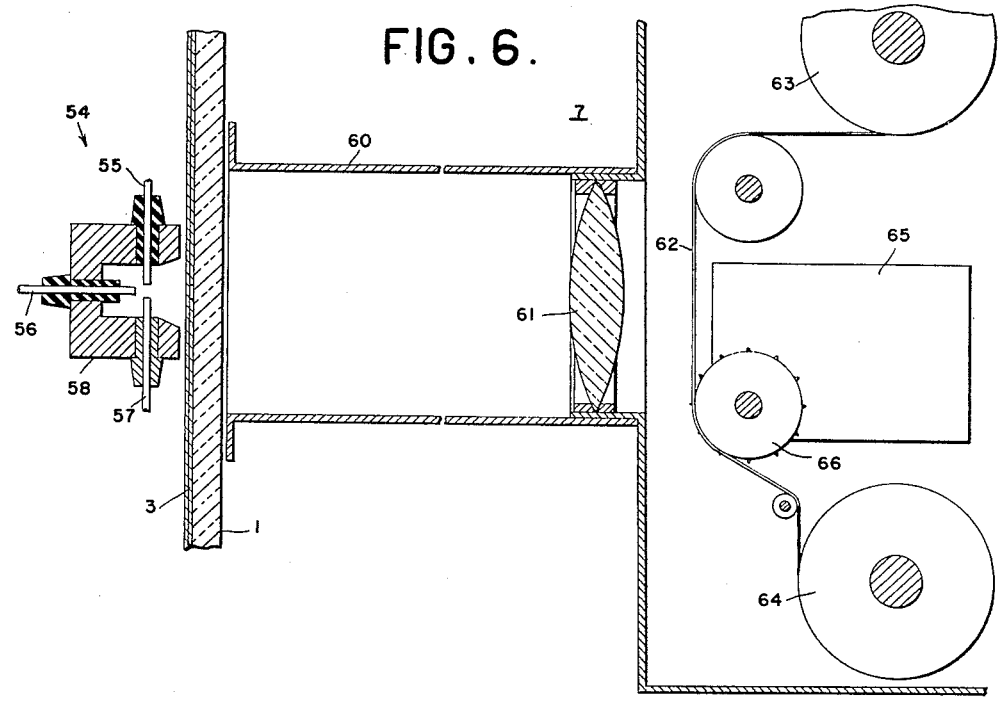
Fig. 6 is an enlarged-scale view taken on line 6—6 of Fig. 4.

Fig. 6 is a section taken on line 6—6 of Fig. 4 and shows, to an enlarged scale, the relative positions of triggered arc 54 of arc unit 10, disc member 1 and camera unit 7. As will be described more in detail hereinbelow, arc 54 comprises a plurality of electrodes 55, 56 and 57 suitably supported in a base member 58. Arc 54 is disposed opposite a character 59 in stencil 3 secured to the surface of disc member 1. Opposite this arc and the corresponding character is mounted camera unit 7 comprising a suitable light shield 60, a lens 61, a photographic medium such as a film 62, reels 63 and 64, respectively for feeding and taking up film 62, and a film-moving means 65 including a sprocket 66 adapted to engage perforations in the edge of the film. The particular means for moving the film do not constitute a part of the present invention and may be of any suitable type, as for example a Geneva movement, driven by shaft 44 (Fig. 4). Alternatively, the film may be moved continuously and a revolving prism or mirror interposed between the disc and the film.

The arc unit

The arrangement of arc unit 10 will be better understood by reference to the perspective view thereof, partly in section, of Fig. 7. The multiple light source or arc unit of this figure comprises base member 58, which is preferably made of metal, as for example brass. Inserted into a plurality of vertical holes in member 58 are first electrodes 55, each of which is supported in and insulated from base member 58 by means of an insulating bushing 67 preferably made of nylon. Horizontal triggering electrodes 56 are similarly fed through insulating bushings 68 into suitably disposed horizontal holes in base member 58. Also mounted in and supported by base member 58, but preferably not insulated therefrom, are second electrodes 57, each of which may be supported by a conductive sleeve or bushing member 69. The electrodes are preferably made of tungsten.

Each group of three electrodes comprises a single triggered arc. Disposed between each pair of these arcs is a substantially opaque barrier member 70, preferably made of a thin sheet of metallic material, as for example brass, and disposed in a suitable slot 71 formed in mounting base 58. These barriers extend practically all the way to the face of base member 58, as indicated, and serve the dual purpose of preventing any possible tendency of the discharge of one arc to cause the discharge of an adjacent arc, and of preventing the illumination produced by one arc from falling upon the character carried by disc member 1 which is at that moment opposite an adjacent arc.

Figure 8:
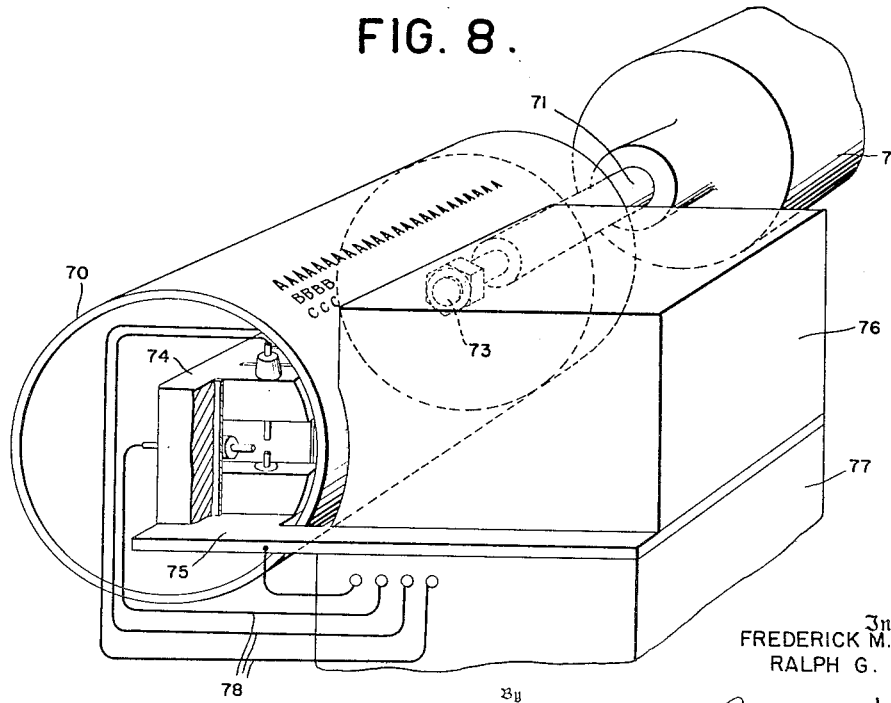
Fig. 8 is a perspective view, partly in section, of a modified form of the present invention, in which the character-carrying member comprises a drum instead of a disc.

Fig. 8 illustrates a modification of the present invention in which the character-carrying member comprises a cylinder or drum 70 mounted directly upon shaft 71 of a motor 72, as for example by a clamping nut 73. In this embodiment, the arc assembly 74 is disposed within drum member 70, being supported in position by a suitable bracket 75. The camera unit and the necessary coding and timing photocells are mounted in a suitable housing 76, which in turn is secured to a base 77 adapted for supporting and housing the necessary associated equipment. Connections 78 are provided between the equipment contained in base members 77 and the electrodes of the arcs of unit 74. Because drum member 70 is adapted for rotating at a substantially higher speed than disc member 1 of Fig. 1, it is feasible to secure to the surface of drum member 70 a stencil containing as few as a single set of characters, if desired, so that one revolution of drum member 70 comprises a recording cycle and results in the recording of a single line of the incoming data. The arrangement of Fig. 8 is especially advantageous where maximum compactness is more important than maximum speed of recording.

The photocell code amplifier

Figure 9:
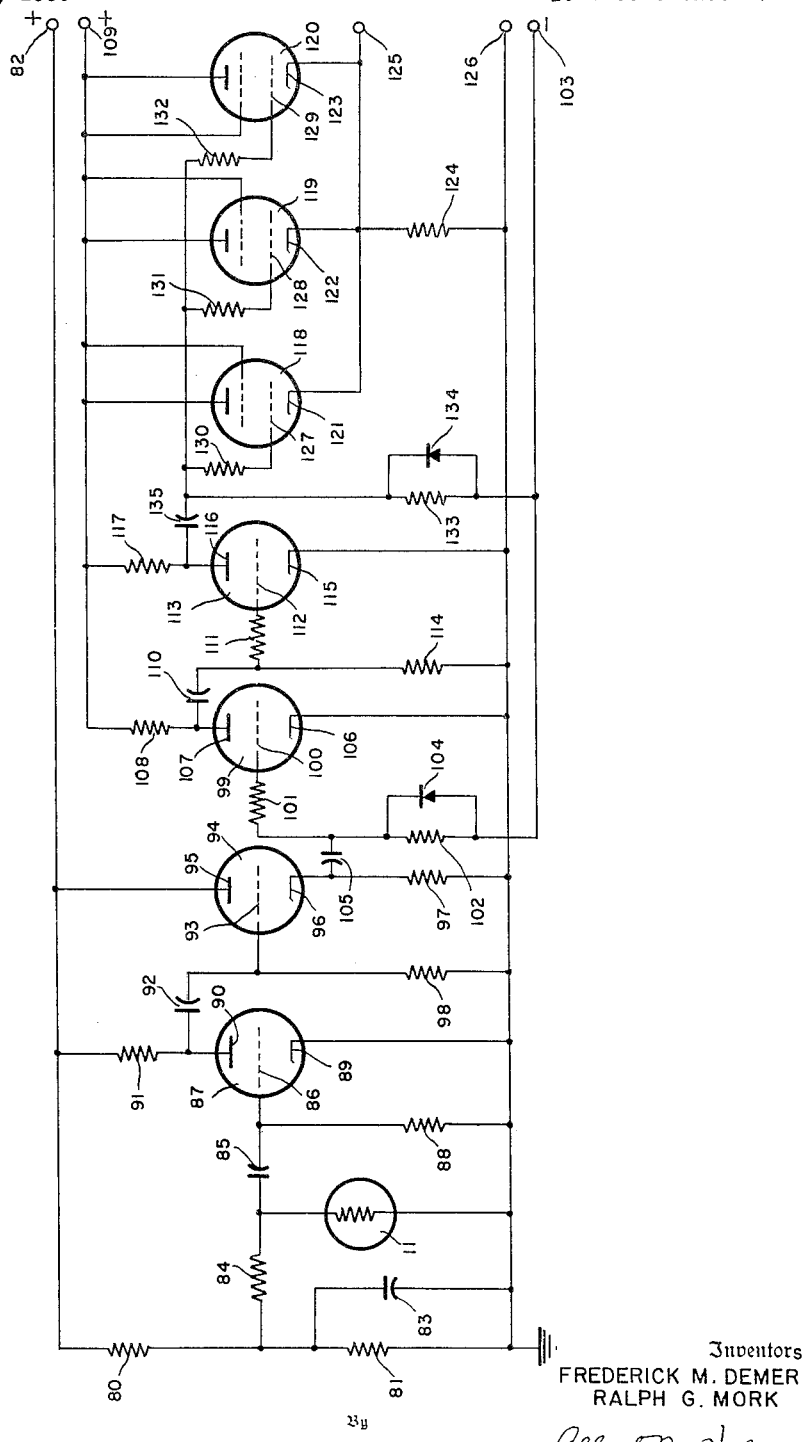
Fig. 9 is a circuit diagram of a single channel of the photocell code amplifier of Fig. 1.

Referring now to Fig. 9, there is shown a circuit diagram of a single channel of photocell code amplifier unit 12 of Fig. 1. For the purpose of supplying voltage to photocell 11, which may be of the lead sulfide type, there is provided a voltage divider comprising resistors 80 and 81 connected in series between a suitable source of positive potential 82 and ground. Resistor 81 is shunted by a capacitor 83. Photocell 11 in series with a load resistor 84 is connected between ground and the junction of resistors 80 and 81. The junction of photocell 11 and resistor 84 is coupled by a capacitor 85 to the control electrode 86 of an electron discharge device 87, preferably of the triode type. A resistor 88 is connected between control electrode 86 and ground. The cathode 89 of discharge device 87 is grounded as shown, and anode 90 is connected through a load resistor 91 to positive potential source 82.

Anode 90 is coupled by a capacitor 92 to the control electrode 93 of an electron discharge device 94 arranged to operate as a cathode follower with its anode 95 connected directly to positive potential source 82. The cathode 96 of discharge device 94 is grounded through a resistor 97. A resistor 98 is connected between control electrode 93 and ground.

There is provided an electron discharge device 99, the control electrode 100 of which is connected through resistors 101 and 102 to a suitable source of negative potential 103. Resistor 102 is shunted by a rectifier element 104. A capacitor 105 is connected between cathode 96 of discharge device 94 and the junction of resistors 101 and 102. The cathode 106 of discharge device 99 is grounded, and anode 107 is connected through a resistor 108 to a suitable source of positive potential 109.

Anode 107 of discharge device 99 is coupled by a capacitor 110 and a resistor 111 in series to the control electrode 112 of an electron discharge device 113. The junction of capacitor 110 and resistor 111 is grounded through a resistor 114. Cathode 115 of discharge device 113 is grounded, and anode 116 is connected through a resistor 117 to positive potential source 109.

There are provided three electron discharge devices 118, 119 and 120, preferably of the tetrode type as shown, and having their cathodes 121, 122 and 123, respectively, connected together and, through a common load resistor 124, to ground. An output terminal 125 is connected to the ungrounded terminal of resistor 124. The other output terminal 126 is grounded. Discharge devices 118, 119 and 120 operate as cathode followers connected in parallel.

Control electrodes 127, 128 and 129 of discharge devices 118, 119 and 120 are provided with individual isolating resistors 130, 131 and 132, the common terminals of which are connected through a resistor 133 to negative potential source 103. Resistor 133 is shunted by a rectifier element 134. A capacitor 135 is connected between anode 116 of discharge device 113 and the common terminals of isolating resistors 130, 131 and 132. The anodes and screen-grid electrodes of discharge devices 118, 119 and 120 are all connected to positive potential source 109 as shown.

In operation, the resistance of photocell 11 decreases when light strikes the cell. The resultant negative-going pulse is inverted and amplified by electron discharge device 87 and is supplied to discharge device 94 operating as a cathode follower. Electron discharge device 99, which is normally non-conductive due to the negative potential applied to its control electrode 100, is rendered conductive by the positive-going pulse developed across resistor 97 and applied to control electrode 100 through capacitor 105. The resultant negative square wave developed at anode 107 of discharge device 99 is amplified and inverted by discharge device 113, and serves to render discharge devices 118, 119 and 120, which are normally substantially non-conductive, conductive so that an output pulse is developed across common load resistor 124 and made available between output terminals 125 and 126. The purpose of rectifier elements 104 and 134 is to prevent blocking of the coupling circuits under a succession of pulses. It will be apparent, therefore, that the circuit arrangement of Fig. 9 produces a relatively large positive pulse of substantially square waveform whenever light from source 8 (Fig. 1) passes through a code marking 4 (Fig. 2) and is permitted to strike photocell 11, and this pulse is supplied to each of storage units 16–19, as explained in connection with Fig. 1.

The timing mark shaper and amplifier

Fig. 10 is a circuit diagram of timing mark shaper and amplifier unit 15 of Fig. 1. For the purpose of supplying voltage to photocell 14, a divider comprising resistors 140 and 141 in series is connected between positive potential source 82 and ground. Resistor 141 is shunted by a capacitor 142. Photocell 14 in series with a load resistor 143 is connected between ground and the junction of resistors 140 and 141. The junction of photocell 14 and resistor 143 is connected to the control electrode 144 of an electron discharge device 145, the cathode 146 of which is grounded through a resistor 147. The anode 148 of discharge device 145 is connected directly to positive potential source 82, so that this discharge device functions as a cathode follower.

Cathode 146 of discharge device 145 is coupled to the control electrode 148a of an electron discharge device 149 by means of a capacitor 150 in series with a resistor 151. For the purpose of rendering discharge device 149 normally conductive, a voltage divider comprising resistors 152 and 153 is connected between positive potential source 109 and ground, the junction of these resistors being connected to the junction of capacitor 150 and resistor 151. The cathode 154 of discharge device 149 is grounded, and its anode 155 is connected through a load resistor 156 to positive potential source 109.

Anode 155 of discharge device 149 is coupled to the control electrode 157 of an electron discharge device 158 by means of a capacitor 159. A resistor 160 is connected between control electrode 157 and ground. The anode 161 of discharge device 158 is connected directly to positive potential source 109. The cathode 162 of this discharge device is grounded through a resistor 163, discharge device 158 operating as a cathode follower.

There are provided four electron discharge devices 164, 165, 166 and 167, the control electrodes 168, 169, 170 and 171 of which are connected through individual isolating resistors 172, 173, 174 and 175 and a common resistor 176 to negative potential source 103. Resistor 176 is shunted by a rectifying element 177. A coupling capacitor 178 is connected between cathode 162 of discharge device 158 and the common terminals of isolating resistors 172–175. The anodes and the screen-grid electrodes of discharge devices 164–167 are connected directly to positive potential source 109. The cathodes of these discharge devices are connected together, to an output terminal 179 and, through a common load resistor 180, to ground. Terminal 126 forms the other output terminal.

In operation, when light strikes photocell 14, a negative-going pulse is developed at control electrode 144 of discharge device 145, and a similar pulse appears at its cathode 146. This negative-going pulse is differentiated by the network comprising capacitor 150 and resistor 153. The resultant negative-going pip is amplified by normally conductive discharge device 149, the positive-going pip being substantially completely clipped by this discharge device. The resultant amplified positive-going pulse at anode 155 of discharge device 149 is passed through discharge device 158 operating as a cathode follower and applied to the control electrodes of discharge devices 164–167, which are arranged to operate as parallel-connected cathode followers and which are normally biased almost to cut-off. This positive-going pulse renders these discharge devices highly conductive, producing a relatively large positive-going pulse across common load resistor 180, output terminals 126 and 179 permitting utilization of this pulse. The purpose of rectifying element 177 is to prevent the coupling circuit between discharge device 158 and discharge devices 164–167 from becoming blocked under a succession of pulses.

It will be understood, of course, that photocell 14 may be replaced by a photocell of the type incorporating a multiplier. In this event, the photocell unit may be returned to a suitable high negative potential source instead of to ground as shown.

The electronic storage units

Fig. 11 is a circuit diagram of electronic storage unit 16 of Fig. 1. This storage unit is identical with the other storage units of Fig. 1, and is chosen for purposes of illustration only.

The storage unit comprises a plurality of electron discharge devices 185–191, preferably of the gas-filled, grid-controlled type generally referred to as thyratrons. Cathodes 192–198 and screen electrodes 199–205, respectively of thyratrons 185–191, are grounded as shown. Control electrodes 206–212 of thyratrons 185–191 are connected through individual resistors 213–219 to a suitable source of negative potential 220. Each of control electrodes 207–212 is also connected to one of input terminals 20 (Fig. 1).

Anodes 221–227 of thyratrons 185–191 are connected through individual load resistors 228–234 to a suitable source of positive potential 235. Each of anodes 221–227 is also connected, through individual series networks comprising one each of resistors 236–242 and rectifier elements 243–249, to a junction 250 at one terminal of a common load impedance such as resistor 251, the other terminal of which is connected to positive potential source 235. The second-group input terminals 24 (Fig. 1) are connected respectively through rectifier elements 252–257 to the junctions of resistors 237–242 and rectifier elements 244–249.

For the purpose of utilizing the potential drop across common load impedance or resistor 251, there is provided a network comprising a rectifier element 258, a capacitor 259 and a resistor 260, this network being connected between junction 250 and negative potential source 103. A voltage-dividing network comprising resistors 261 and 262 is connected between positive potential source 235 and ground. The junction 306 of resistors 261 and 262 is connected by means of a resistor 263 to the junction 307 of rectifier element 258 and capacitor 259.

There is provided a multi-electrode vacuum tube 264, the cathode 265 and the suppressor-grid 266 of which are grounded as shown. Control electrode 267 is connected through a resistor 268 to the junction of capacitor 259 and resistor 260. Screen-grid 269 is connected through a resistor 270 to positive potential source 109, and is by-passed to ground by a capacitor 271. Electrode 272 is connected through resistors 273 and 274 in series to negative potential source 220. Input terminal 179 (Fig. 10) is coupled by a capacitor 275 to the junction of resistors 273 and 274.

Anode 276 of discharge device 264 is connected through a resistor 277 to positive potential source 109 and is coupled, by means of a capacitor 278, to the control electrode 279 of an electron discharge device 280. For the purpose of maintaining discharge device 280 normally conductive, a network comprising resistors 281 and 282 in series is connected between positive potential source 109 and ground, the junction of these resistors being connected to control electrode 279. Cathode 283 of discharge device 280 is connected to ground through a resistor 284, and is coupled by a capacitor 285 to an output terminal 286. Screen-grid 287 and anode 288 of discharge device 280 are connected directly to positive potential source 109. Device 280 thus operates as a normally conductive cathode follower.

There is also provided an electron discharge device 289, the control electrode 290 of which is coupled by a capacitor 291 to cathode 283 of discharge device 280. Resistor 292 is connected between control electrode 290 and ground. Cathode 293 of discharge device 289 is grounded through a resistor 294 shunted by a capacitor 295.

Anode 296 of discharge device 289 is connected through a resistor 297 to positive potential source 109, and is coupled by a capacitor 298 to the control electrode 299 of an electron discharge device 300. Cathode 301 of discharge device 300 is directly connected to cathode 293 of discharge device 289. A voltage divider comprising resistors 302 and 303 in series is connected between positive potential source 109 and cathode 301, the junction to these resistors being connected to control electrode 299 for the purpose of maintaining this electrode at a suitable positive potential with respect to cathode 301. Thus discharge device 300 is normally conductive and its anode current, flowing through resistor 294, maintains discharge device 289 normally non-conductive. Anode 304 of discharge device 300 is connected through a resistor 305 to positive potential source 109, and is also coupled by a capacitor 308 to control electrode 206 of thyratron 185.

The operation of the electronic storage unit of Fig. 11 may best be understood if specific voltage values are assumed merely by way of example of typical operating conditions. Other values may, of course, be equally well employed in embodiments having different constants. At the beginning of a recording cycle, thyratrons 185–191 are non-conductive, due to the negative potential which is applied to their control electrodes 206–212 from negative potential source 220 through resistors 213–219. When one or more of input terminals 20 is grounded, as for example through a perforation in a punched card being used as the source of input data to be recorded, the corresponding thyratron becomes conductive and remains so far the balance of the recording cycle, until the whole storage unit is reset by interruption of positive potential source 235 in a manner later to be described. If it be assumed that positive potential source 235 is approximately 90 volts, junction 250 will also be at a potential of 90 volts when thyratrons 185–191 are all non-conductive. If any one of these thyratrons becomes conductive, a current will flow from positive potential source 235 through common load resistor 251, through one of rectifier elements 243–249, and through one of thyratron load resistors 228–234, so that the potential of junction 250 will drop to approximately 17 volts. If more than one of thyratrons 185–191 fire, the voltage of junction 250 will be lower than 17 volts, but will not drop below approximately 11 volts even if all the thyratrons are conductive.

Terminals 24 carry input signals from photocell code amplifier unit 12 (Figs. 1 and 9) in the form of positive-going pulses of approximately 90 volts. Let it be assumed for instance that thyratron 186 has been fired and is conductive, so that the potential at junction 250 is approximately 17 volts. In this event, a signal pulse on terminal 24 associated with this thyratron will be applied through rectifier element 252 in such a manner that the potential of junction 250 is restored substantially to its original value of approximately 90 volts. This condition results from the flow of current through rectifier element 252 and resistor 237. If thyratron 187 had also been conductive, however, junction 250 would not have been restored to its initial value of approximately 90 volts, since the voltage across resistor 251, due to the current flowing through thyratron 187, would have been too great to have been overcome by the impressed input signal pulse. A similar condition would have existed had one or more of the remaining thyratrons 185 and 188–191 been in a conductive condition instead of thyratron 187. From this it will be evident that the potential of junction 250 will rise during a recording cycle whenever there is a positive pulse on the input terminal 24 corresponding with each of the thyratrons 186–191 previously rendered conductive by the grounding of the associated terminal 20.

Junction 305 is maintained at a potential of approximately 40 volts due to the action of voltage-dividing resistors 261 and 262. Due to the presence of rectifier element 258, any rise in potential of junction 250 which is less than 40 volts has no appreciable effect upon the potential of junction 307. If the potential rise of junction 250 is greater than 40 volts, however, rectifier element 258 becomes conductive with the result that the potential of junction 307 rises. This method of discriminating against signals of abnormally low level at junction 250 prevents undesired operation of the circuit by spurious signals due to capacitive coupling and to the normal variation of the potential of junction 250 with the number of thyratrons fired.

The positive-going signal pulses at junction 307 are mixed, in discharge device 264, with positive-going timing pulses appearing at terminal 179, these pulses having been developed in timing mark shaper and amplifier unit 15 as previously described in connection with Fig. 10. The simultaneous presence of a signal pulse at junction 307 and of a timing pulse at input terminal 179 renders discharge device 264 conductive, thus developing a negative-going pulse at its anode 276. This negative-going pulse is applied to control electrode 279 of normally conductive discharge device 280, thus cutting off the current flow through this discharge device and causing the development of a negative-going output signal pulse at terminal 286. This pulse is utilized, in a manner later to be described, to actuate one channel of trigger generator unit 28 which in turn causes the discharge of the corresponding arc in arc unit 10.

Referring momentarily to Fig. 2 of the drawings, it will be apparent that grouped code markings 4 are arranged in a rising sequence insofar as their complexity is concerned as disc 1 revolves in a counterclockwise direction through an arc corresponding to a single recording cycle. The desired signal from each electronic storage unit, therefore, is the one which corresponds with the first coincidence of incoming pulse signals on terminals 24 with the fired thyratrons. It will be apparent that the code markings corresponding with lines of characters appearing later will include not only the fired thyratron pattern but also other markings in addition.

In accordance with an important feature of the present invention, means are provided for preventing the application of subsequent groups of positive potentials on terminals 24 from producing an additional change in potential drop across common load resistor 251. This is accomplished by differentiating the negative-going output pulse developed across resistor 284 by means of capacitor 291 and resistor 292, the resultant differentiated signal being applied to control electrode 290 of discharge device 289. The negative-going pip at the beginning of each such differentiated signal has no appreciable effect upon normally non-conductive discharge device 289. The positive-going pip at the end of the signal, however, renders device 289 momentarily conductive, thus producing a negative-going pulse at its anode 296. After inversion in discharge device 300, this pulse is applied as a positive-going pulse to control electrode 206 of thyratron 185. This in turn causes firing of this thyratron, so that it remains conductive for the balance of the recording cycle and thus prevents the generation of a second output signal across common resistor 251 during the recording cycle, in the manner previously described.

Trigger generator and associated arc

Fig. 12 is a circuit diagram of a single channel of the trigger generator and associated triggered arc of Fig. 1. The trigger channel comprises an electron discharge device 310 having a control electrode 311 connected to input terminal 286. A resistor 312 is connected between control electrode 311 and ground. Cathode 313 of discharge device 310 is grounded. Screen-grid 314 is connected through a resistor 315 to positive potential source 109. Anode 316 is connected through an inductor 317 to positive potential source 109. Anode 316 is also connected through a current-limiting resistor 318 to trigger electrode 56 of triggered arc 54. Electrode 55 is connected through an isolating resistor 320 to a source of high positive potential 321. Electrode 57 is grounded, and a capacitor 322 is connected between electrodes 55 and 57.

In operation, capacitor 322 is charged through resistor 320 from source 321 to a potential somewhat lower than that required to break down the gap between electrodes 55 and 57. Electron discharge device 310 is normally conductive. When a negative-going signal pulse is applied between terminals 286 and 126, discharge device 310 becomes suddenly non-conductive. Due to the presence of inductor 317, this sudden cut-off of discharge device 310 causes a high-voltage transient to appear at anode 316, and this transient is applied through resistor 318 to trigger electrode 56, in turn causing a triggering arc between electrodes 56 and 57. Ionization produced by this arc alters the breakdown characteristic of the gap between electrodes 55 and 57 to such an extent that the potential across capacitor 322 is sufficient to cause an arc between electrodes 55 and 57. The energy stored in capacitor 322 maintains this arc at a high intensity for a very short interval of time, as for example approximately one microsecond, producing a brilliant blue light. After the energy in capacitor 322 has been dissipated in this manner, this capacitor is recharged from source 321 to its original potential level before another discharge may be called for during the next recording cycle. In contrast, the triggering arc between electrodes 56 and 57 is dim and filamentary in appearance, and hence has no appreciable effect upon the photographic medium or film 62 (Fig. 6). Its duration is dependent upon the width of the negative-going pulse applied to input terminal 286, and may be of the order to ten microseconds.

Reset amplifier and associated equipment

In order to restore thyratrons 185–191 of the storage unit of Fig. 11 and the thyratrons of all of the other storage units to their normal non-conductive condition at the end of each recording cycle, means are provided for momentarily interrupting the potential at terminal 235 (Fig. 11). Such means are shown in Fig. 13, which also shows an arrangement for maintaining the potential at terminal 235 substantially constant during each recording cycle.

In Fig. 13, photocell 11a and electron discharge devices 325, 326, 327, 328 and 329, together with the circuit components associated therewith, are arranged to function exactly as do photocell 11 and electron discharge devices 87, 94, 99 and 113, and the components associated with them, of the photocell code amplifier of Fig. 9. Thus, when light from light source 8 (Fig. 1) passes through an opening 29 in segment 3 (Fig. 2) and strikes photocell 11a, a positive-going pulse is developed across load resistor 330 in the cathode circuit of electron discharge device 329.

For the purpose of utilizing this positive-going pulse to momentarily interrupt the supply potential at terminal 235, there is provided an electron discharge device 331 having a control electrode 332 coupled by means of a resistor 333 and a capacitor 334 to the ungrounded terminal of resistor 330. A resistor 335 is connected between negative potential source 220 and the junction of resistor 333 and capacitor 334. Cathode 336 of discharge device 331 is grounded. Screen-grid 337 is connected directly to positive potential source 82. Anode 338 is connected through a load resistor 339 to positive potential source 82.

Three electron discharge devices 340, 341 and 342, preferably of the triode type, are provided, their cathodes 343, 344 and 345 being connected together and, through a common load resistor 346, to ground. The ungrounded terminal of resistor 346 is connected to positive potential terminal 235. Control electrodes 347, 348 and 349, respectively of discharge devices 340, 341 and 342, are connected through individual isolating resistors 350, 351 and 352 to a common lead 353. Capacitor 354 is connected between common lead 353 and anode 338 of discharge device 331. Anodes 355, 356 and 357 of discharge devices 340, 341 and 342 are connected directly to positive potential source 109.

For the purpose of regulating the supply potential at terminal 235, there is provided an electron discharge device 358 having a cathode 359 which is connected to negative potential source 220. A voltage divider comprising a resistor 360, a potentiometer 361 and a resistor 362 in series is connected between negative potential source terminal 220 and positive potential terminal 235. The movable arm 363 of potentiometer 361 is connected through a battery 364 to control electrode 365 of discharge device 358. Anode 366 of discharge device 358 is connected through a load resistor 367 to positive potential source 109, and is also directly connected to common lead 353.

In operation, electron discharge device 331 is non-conductive during the recording cycle, and hence has no appreciable effect upon the operation of discharge devices 340, 341 and 342, whose anode-cathode paths are effectively in series between positive potential source 109 and positive potential terminal 235. The bias voltage applied to control electrodes 347, 348 and 349 of discharge devices 340, 341 and 342, and hence the impedance of their anode-cathode paths, is determined by the potential drop across resistor 367, which in turn is a function of the potential of control electrode 365 of discharge device 358. This potential is initially adjusted by means of movable arm 363 of potentiometer 361 to provide the desired potential across resistor 346 and hence at positive potential terminal 235. Since the bias voltage on control electrode 365 of discharge device 358 also depends upon the potential at terminal 235, minor fluctuations in the latter voltage are substantially compensated for in a manner well known in the art.

Now let it be assumed that a positive-going pulse is developed across resistor 330 and applied through capacitor 334 to control electrode 332 of discharge device 331. Such a pulse causes this discharge device to become conductive, so that a relatively large negative-going pulse is developed at its anode 338 and applied, through capacitor 354, to control electrodes 347, 348 and 349 of discharge devices 340, 341 and 342, thus rendering these devices non-conductive. This in turn causes the potential at terminal 235 to drop substantially to zero, where it remains for the duration of the positive-going pulse across resistor 330. It will be apparent, therefore, that the arrangement of Fig. 13 provides a regulated potential for the electronic storage units of Fig. 1 during each recording cycle, and also insures that the potential of this source drops substantially to zero whenever an opening 29 (Fig. 2) passes between light source 8 and photocell 11a (Fig. 1).

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a photographic recorder with a continuously movable character-carrying member having a plurality of columns of characters and code markings, the characters in said columns being arranged in sets with the corresponding characters of said columns disposed in straight lines and one of said code markings corresponding with each said line, said code markings progressively increasing in complexity in each said set, the combination of: means adjacent one surface of said member for supporting a photographic medium in position for exposure; means for selectively exposing the characters on said member upon said photographic medium, said exposing means including a plurality of triggered arcs, one for each column of characters, said arcs being fixedly disposed adjacent the other surface of said member; means for establishing a predetermined pattern corresponding to each character to be recorded; means for firing each said arc upon the first coincidence of a code marking and said pattern at a selected differential time during the transit period of each of said sets of characters past said photographic medium, each said arc upon being fired trans-illuminating said member and exposing a single character once to said photographic medium; and means for preventing any later coincidences of said code markings and said pattern from causing additional firings of each said arc during said same transit period.

2. In a photographic recorder with a continuously movable character-carrying member having a plurality of columns of characters and individual and grouped code markings, the characters in said columns being arranged in sets with the corresponding characters of said columns disposed in straight lines and one each of said individual code markings and groups of code markings corresponding with each said line, said groups of code markings progressively increasing in complexity in each said set, the combination of: means adjacent one surface of said member for supporting a photographic medium in position for exposure; means for selectively exposing the characters on said member upon said photographic medium, said exposing means including a plurality of triggered arcs, one for each column of characters, said arcs being fixedly disposed adjacent the other surface of said member; means for establishing a predetermined pattern corresponding to each character to be recorded; means for firing each said arc upon the first coincidence of a group of code markings and said pattern at a selected differential time dependent upon said individual code markings during the transit period of each of said sets of characters past said photographic medium, each said arc upon being fired trans-illuminating said member and exposing a single character once to said photographic medium; and means for preventing any later coincidences of groups of code markings and said pattern from causing additional firings of each said arc during said same transit period.

3. In a photographic recorder with a continuously rotatable character-carrying disc having a plurality of columns of characters and code markings, the characters in said columns being arranged in sets and being disposed equidistantly from the rotational axis of said disc with the corresponding characters of said columns disposed in straight lines and one of said code markings corresponding with each said line, said code markings progressively increasing in complexity in each said set, the combination of: means adjacent one surface of said disc for supporting a photographic medium in position for exposure; means for selectively exposing the characters on said disc upon said photographic medium, said exposing means including a plurality of triggered arcs, one for each column of characters, said arcs being fixedly disposed adjacent the other surface of said disc; means for establishing a predetermined pattern corresponding to each character to be recorded; means for firing each said arc upon the first coincidence of a code marking and said pattern at a selected differential time during the transit period of each of said sets of characters past said photographic medium, each said arc upon being fired trans-illuminating said disc and exposing a single character once to said photographic medium; and means for preventing any later coincidences of said code markings and said pattern from causing additional firings of each said arc during said same transit period.

4. In a photographic recorder with a continuously rotatable character-carrying drum having a plurality of columns of characters and code markings, the characters in said columns being arranged in sets with the corresponding characters of said columns disposed in straight lines parallel to the rotational axis of said drum and one of said code markings corresponding with each said line, said code markings progressively increasing in complexity in each said set, the combination of: means adjacent one surface of said drum for supporting a photographic medium in position for exposure; means for selectively exposing the characters on said drum upon said photographic medium, said exposing means including a plurality of triggered arcs, one for each column of characters, said arcs being fixedly disposed adjacent the other surface of said drum; means for establishing a predetermined pattern corresponding to each character to be recorded; means for firing each said arc upon the first coincidence of a code marking and said pattern at a selected differential time during the transit period of each of said sets of characters past said photographic medium, each said arc upon being fired trans-illuminating said drum and exposing a single character once to said photographic medium; and means for preventing any later coincidences of said code markings and said pattern from causing additional firings of each said arc during said same transit period.

References Cited in the file of this patent

UNITED STATES PATENTS

| | | |
|---|---|---|
| Re. 23,285 | Mumma | Oct. 17, 1950 |
| 2,244,497 | McNaney | June 3, 1941 |
| 2,346,251 | Bryce | Apr. 11, 1944 |
| 2,355,268 | Bryce | Aug. 8, 1944 |
| 2,364,188 | Bryce | Dec. 5, 1944 |
| 2,377,754 | Bryce | June 5, 1945 |
| 2,391,611 | Back | Dec. 25, 1945 |
| 2,405,664 | Mumma | Aug. 13, 1946 |
| 2,475,497 | Harrold | July 3, 1949 |
| 2,486,406 | Higonnet | Nov. 1, 1949 |
| 2,542,311 | Carlson | Feb. 20, 1951 |
| 2,600,168 | Klyce | June 10, 1952 |